(12) United States Patent
Entezari et al.

(10) Patent No.: US 9,026,865 B2
(45) Date of Patent: May 5, 2015

(54) SOFTWARE HANDLING OF HARDWARE ERROR HANDLING IN HYPERVISOR-BASED SYSTEMS

(75) Inventors: Mehdi Entezari, Collegeville, PA (US); Edward T. Cavanagh, Jr., Eagleville, PA (US); Bryan E. Thompson, Morgantown, PA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 13/493,023

(22) Filed: Jun. 11, 2012

(65) Prior Publication Data

US 2013/0332922 A1    Dec. 12, 2013

(51) Int. Cl.
*G06F 11/00*    (2006.01)
*G06F 9/455*    (2006.01)

(52) U.S. Cl.
CPC .. *G06F 9/45558* (2013.01); *G06F 2009/45579* (2013.01); *G06F 2009/45587* (2013.01)

(58) Field of Classification Search
USPC ............................................. 714/1, 2, 43, 48
See application file for complete search history.

(56) References Cited

U.S. PATENT DOCUMENTS

| 6,643,727 | B1* | 11/2003 | Arndt et al. .................. 710/314 |
| 2003/0204780 | A1* | 10/2003 | Dawkins et al. ................ 714/24 |
| 2004/0215916 | A1* | 10/2004 | Bennett et al. ................ 711/173 |
| 2008/0126852 | A1* | 5/2008 | Brandyberry et al. ............ 714/8 |
| 2009/0119551 | A1* | 5/2009 | Boyd et al. ....................... 714/48 |
| 2009/0144579 | A1* | 6/2009 | Swanson .......................... 714/3 |
| 2009/0248949 | A1* | 10/2009 | Khatri et al. ..................... 711/6 |
| 2010/0115143 | A1* | 5/2010 | Nakajima ........................ 710/5 |
| 2011/0138219 | A1* | 6/2011 | Walton et al. .................... 714/3 |
| 2011/0320860 | A1* | 12/2011 | Coneski et al. ................ 714/5.1 |
| 2012/0233508 | A1* | 9/2012 | Khatri et al. .................... 714/49 |

* cited by examiner

*Primary Examiner* — Yolanda L Wilson
(74) *Attorney, Agent, or Firm* — Richard J. Gregson

(57) ABSTRACT

Errors occurring on a hardware bus of a hypervisor-based system may be handled in software monitors in the hypervisor-based system. When an error occurs, guest partitions on the hypervisor-based system may be notified of the error through a monitor executing in each guest partition. Only guest partitions affected by the error may be shut down or provided other instructions for taking an action in response to the error.

18 Claims, 8 Drawing Sheets

SOFTWARE HANDLING OF HARDWARE ERROR HANDLING IN HYPERVISOR-BASED SYSTEMS

The instant disclosure relates to error handling. More specifically, this disclosure relates to error handling in hypervisor-based systems.

BACKGROUND

Hypervisor-based systems may execute multiple operating systems within through multiple guest partitions. The guest partitions share access to hardware in the hypervisor-based system. The hardware in the hypervisor-based system may be designed to provide robust error reporting. Conventionally, errors reported by the hardware are either correctable or uncorrectable. Correctable errors are treated as warnings. The uncorrectable errors are handled differently, based on whether they are non-fatal or fatal. Non-fatal errors are serious, but the system may handle these errors through other means, such as redundant paths. Fatal errors are errors that affect the integrity of operations in the system, and may cause serious system reliability issues if the system continues to operate without taking a corrective action.

When error reporting is enabled in a single partition system, a fatal uncorrectable error may deliberately cause the system to reboot or shut down to prevent further unintended damage, such as data corruption. However, a system shutdown is not a desirable approach in a hypervisor-based system having multiple partitions residing in a single system. When a system shutdown occurs, all guest partitions on the system become unavailable. Thus, an error in one guest partition results in unavailability of all guest partitions. Maintaining reliability of the hypervisor-based system may be difficult in these circumstances. For example, additional planning may be required to ensure critical software does not execute on guest partitions sharing hardware with unreliable software. Such planning may be difficult, because guest partitions generally cannot access other guest partitions in the hypervisor-based system.

SUMMARY

According to one embodiment, a method includes receiving, from a bus of a hypervisor system, an error interrupt. The method also includes identifying at least one affected guest partitions from a plurality of guest partitions executing on the hypervisor system. The method further includes broadcasting the error interrupt to the affected guest partitions. [This is a repeat of the claim language at the end of the document. You may skip this section in your review and review the claims at the end of the document.]

According to another embodiment, a computer program product includes a non-transitory computer readable medium having code to receive, from a bus of a hypervisor system, an error interrupt. The medium also includes code to identify at least one affected guest partitions from a plurality of guest partitions executing on the hypervisor system. The medium further includes code to broadcast the error interrupt to the affected guest partitions.

According to a further embodiment, an apparatus includes a bus and a processor coupled to the bus. The processor is configured to receive, from a bus of a hypervisor system, an error interrupt. The processor is also configured to identify at least one affected guest partitions from a plurality of guest partitions executing on the hypervisor system. The processor is further configured to broadcast the error interrupt to the affected guest partitions.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

An error generated by one device may be contained within the partitions that share the device. This reduces the likelihood that an error on the hardware bus creates an interruption in the normal operation of the other guest partitions. The error may be handled in software as the hypervisor-based system having the device that caused the error.

Figure 1:
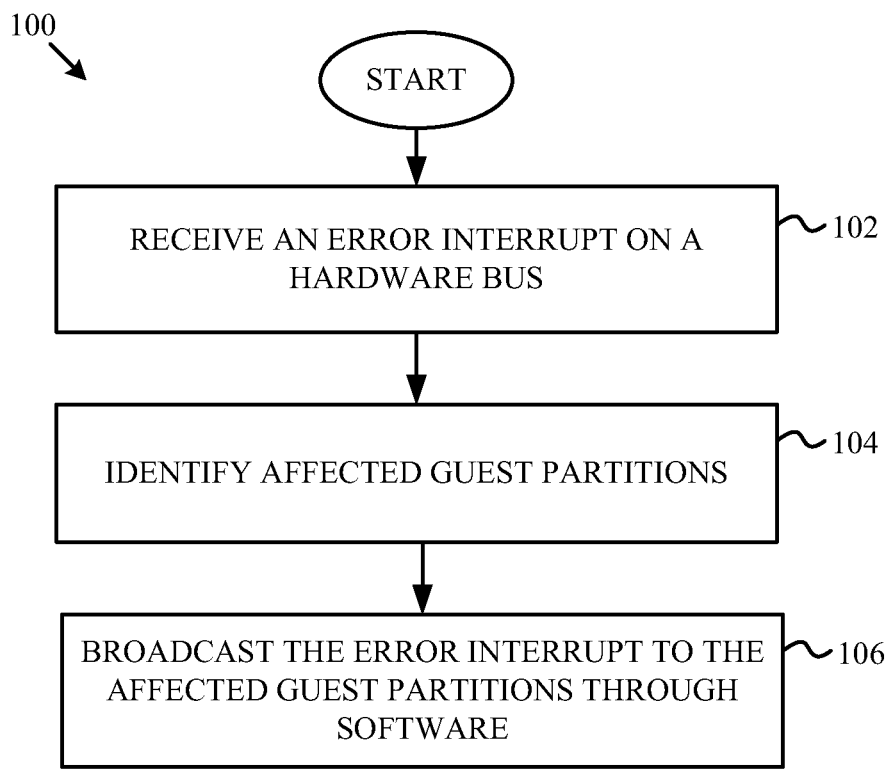
FIG. 1 is a flow chart illustrating a method of handling bus errors in software according to one embodiment of the disclosure

FIG. 1 is a flow chart illustrating a method of handling bus errors in software according to one embodiment of the disclosure. A method 100 begins at block 102 with a hypervisor-based system receiving an error interrupt on a hardware bus. At block 104, the affected guest partitions are identified. The affected guest partitions may be determined by identifying guests partitions owning the device that generated the error interrupt. At block 106, the error interrupt is broadcast to the affected guest partitions through a software monitor. A monitor executing on each guest partition may receive the error interrupt and take appropriate corrective action. For example when the error in uncorrectable, the affected guest partition may shut down. In another example when the error is correctable, the affected guest partition may repeat a read or write request to a memory device coupled to the hardware bus.

According to one embodiment, the error interrupt may be broadcast to all guest partitions. A monitor installed in each of the guest partitions may receive the broadcast error interrupt and determine whether the source of the error interrupt is a device assigned to the guest partition. If the error interrupt does not affect the guest partition, the guest partition may continue operating normally. If the error interrupt does affect the guest partition, the guest partition may wait for a message from a central error handling routine on a service partition, such as an advanced configuration and power interface (ACPI) service partition, of the system executing the guest partitions. The service partition may identify affected guest partitions assigned to the device that generated the error interrupt and transmit messages to the affected guest partitions. The message may include a corrective action for the guest partition to take, such as rebooting the guest partition. Alternatively, the message may include an instruction to remove and clear the device that caused the error.

According to one embodiment, the hardware bus may be a peripheral component interface express (PCI-e) bus. Advanced error reporting (AER) in PCI-e employs hardware that resides in hierarchical components including root ports, switches, and devices. Root ports, switches, and devices may have AER enabled or disabled. Software may be programmed to access and control the AER-enabled components on the PCI-e bus. In a virtualized environment, a guest partition or virtual machine may only see a device or particular exposed function of a device. The hypervisor-based system executing the guest partitions may interface with devices to handle error reporting and report errors to the guest partitions affected by the error that otherwise would not receive the error from the hardware bus due to limited access to the hardware devices.

Figure 2:
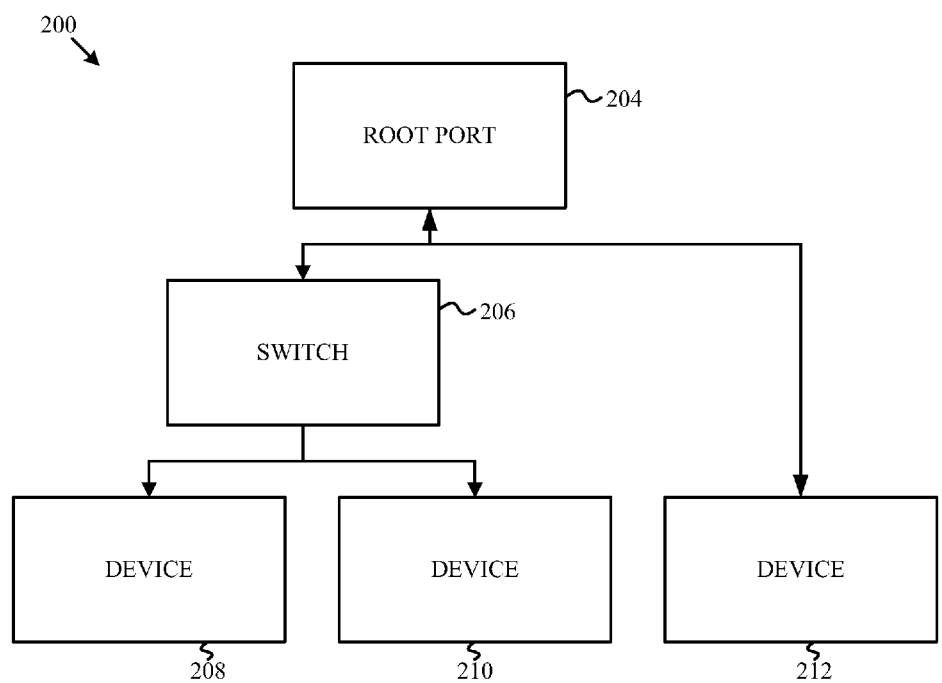
FIG. 2 is block diagram illustrating components coupled to a bus involved at various aspects of error reporting according to one embodiment of the disclosure.

FIG. 2 is block diagram illustrating components coupled to a bus involved at various aspects of error reporting according to one embodiment of the disclosure. A system 200 includes a root port 204. The root port 204 may have memory storage, which includes correctable, non-fatal, and fatal error registers. Other root port registers may include a root error command register, a root error status register, an error source identification register, a root control register, a device control register, and a bridge control register. The root error status register and error source identification registers may store information regarding an error after an error interrupt occurs. A switch 206 coupled to the root port 204 may include memory, such as correctable, non-fatal, and fatal error registers. Other registers in the switch 206 may include a device control register and a bridge control register. Devices 208 and 210 may be coupled to the root port 204, through the switch 206. A device 212 may also be coupled directly to the root port 204. Devices 208, 210, and 212 may include memory storage such as correctable, non-fatal, and fatal error registers. Other registers in the devices 208, 210, and 212 may include a device control register.

When an error occurs in one of the devices 208-212 or the switch 206, error bits may be set in their error status registers. Then, a header log and a message may be sent to the root port 204. The root port 204 may modify an error source identification register based, in part, on the message and generate an error interrupt transmitted to hardware and/or software is coupled to the root port 204, such as a hypervisor-based system. Alternatively, when the root port 204 detects an error, the root port 204 may set status bits and an error source identification before generating the interrupt.

Figure 3:
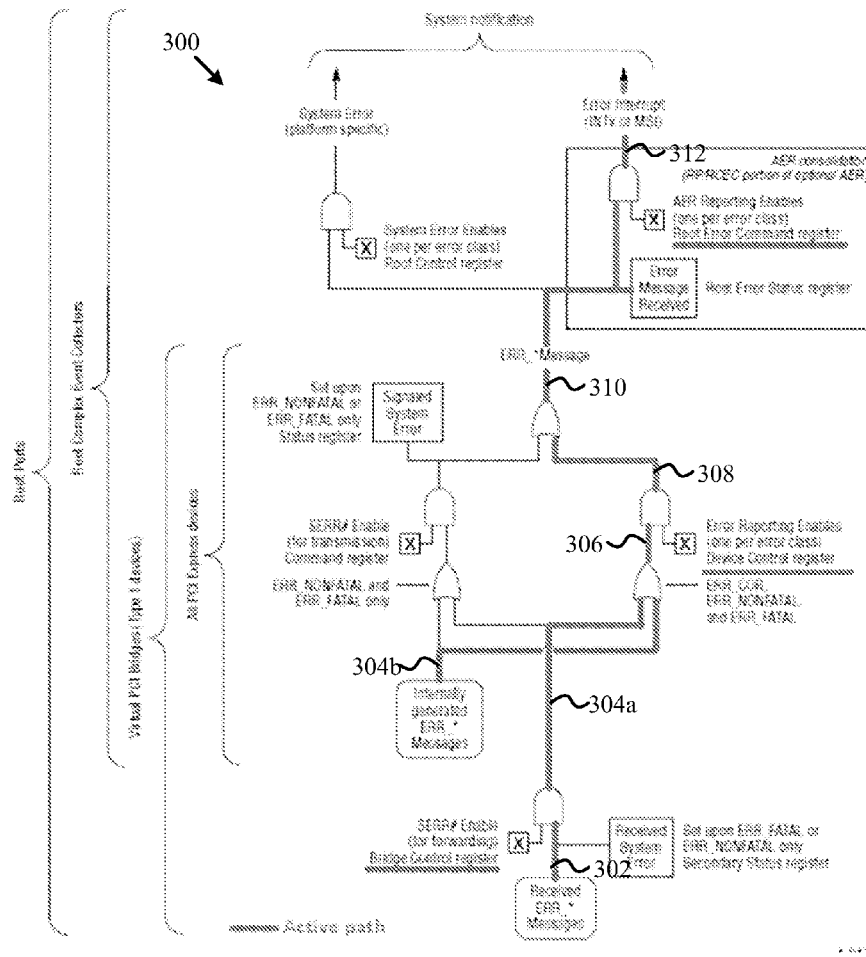
FIG. 3 is logic diagram illustrate a logic flow for error message controls in a peripheral component interface express (PCI-e) system according to one embodiment of the disclosure.

FIG. 3 is logic diagram illustrate a logic flow for error message controls in a peripheral component interface express (PCI-e) system according to one embodiment of the disclosure. A logic diagram 300 includes logic gates representing operations performed during error handling. An active path 302-312 through the logic diagram 300 illustrates paths for handling errors occurring on the hardware bus according to one embodiment of the disclosure. First, an error message may be received at path 302. The error message may be transmitted through path 304a, 306, 308, and 310 to generate an error interrupt at path 312. Alternatively, an internally generated error message may propagate from path 304b through paths 306, 308, and 310 to generate an error interrupt at path 312. The error interrupt generated in path 312 may be transmitted as a system notification to the hypervisor-based system, which then identifies affected guest partitions and alerts the affected guest partitions.

During propagation of the error through the logic flow 300 of FIG. 3, devices, such as the devices 208-212 of FIG. 2, may modify bits corresponding to correctable error reporting, non-fatal error reporting, fatal error reporting, and unsupported request reporting in the control register of the respective device. Additionally, a parity error response bit and a SERR# bit may be set in the command register of the device. In parallel, switches, such as the switch 206 of FIG. 2, may enable correctable error reporting bits, non-fatal error reporting bits, fatal error reporting bits, and/or unsupported request reporting bits in the control register of the switch. Additionally, set parity error response bits may be cleared in the command register, and the system error (SERR#) bit set in the bridge control register. The root port, such a the root port 204 of FIG. 2, may enable a correctable error reporting bit, a non-fatal error reporting bit, a fatal error reporting bit, and an unsupported request reporting bit in the device control register. Additionally, a parity error response bit may be set, a SERR# bit may be cleared in the command register, and the SERR# bit may be set in the bridge control register. The root port may further ensure system error on correctable, non-fatal, and fatal error enables are off in the root control register, and set the correctable, non-fatal, and fatal error reporting bits in the root error command register.

After the error interrupt is generated and distributed to affected guest partitions, a software monitor function in each guest partition may take corrective action. According to one embodiment, the error interrupt may be broadcast to all instances of monitor software in the guest partitions. Decisions on what action the guest takes in response may be specific to how the error affects that guest, if at all. Thus, the effect on guest partitions of an error interrupt in other guest partitions is reduced, because not all guest partitions are shut down when an error only affects some of the guest partitions.

Certain errors reported through AER in the PCI-e bus may be determined to be fatal and receive a certain response from the hypervisor-based system or the guest partitions when such an error is generated. Table 1 provides a list of error codes, the corresponding error, and whether such an error is fatal.

TABLE 1

| Error ID | Error | Fatal |
|---|---|---|
| 1 | Data Link Error | Y |
| 2 | Surprise Down | N |
| 3 | Poisoned TLP | Y |
| 4 | TC Protocol Error | Y |
| 5 | Completion Timeout | Y |
| 6 | Completer Abort | Y |
| 7 | Unexpected Completion | Y |
| 8 | Receiver Error | Y |
| 9 | Malformed TCP | Y |
| 10 | ECRC Error | Y |
| 11 | Unsupported Request Error | Y |

Correctable errors are listed in Table 2, including a threshold value for a number of allowed correctable errors of each type before an action is taken. For example, when individual correctable errors occur a first response may be taken. When a specified number of correctable errors of a certain type have occurred, a function may be called to notify the system and reset the counter for that particular correctable error.

TABLE 2

| Error ID | Error | Threshold value in 7-day period |
|---|---|---|
| 21 | Receiver Error | 2 |
| 22 | Bad TLP | 2 |
| 23 | Bad DLLP | 2 |
| 24 | REPLAY_NUM Rollover | None |
| 25 | Relay Timer Timeout | 1 |
| 26 | Advisory Non-Fatal Error | 2 |

Figure 4:
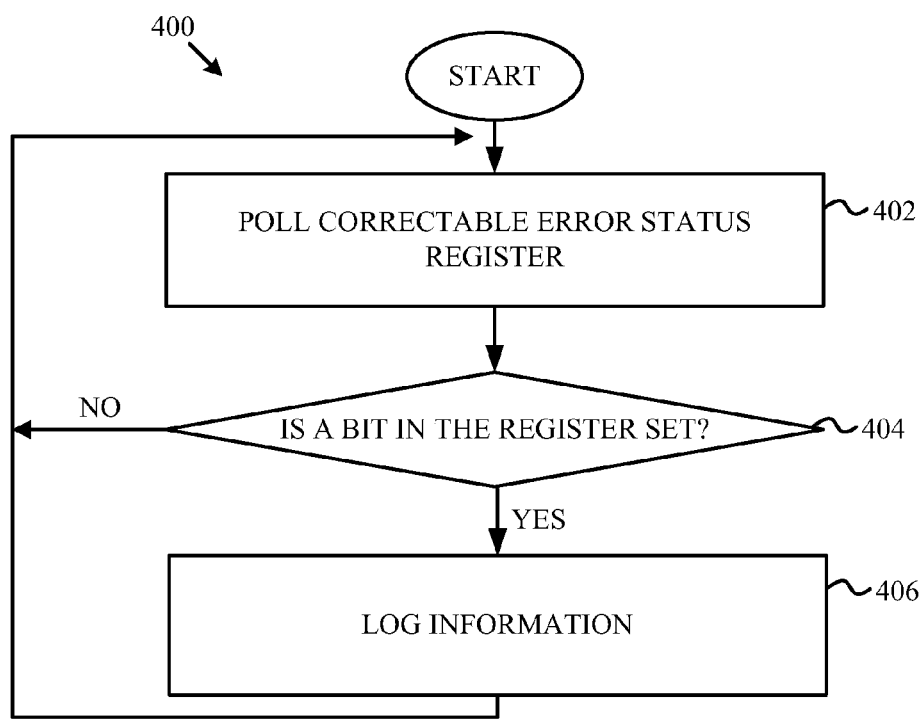
FIG. 4 is a flow chart illustrating a method of handling correctable errors in a peripheral component interface express (PCI-e) bus according to one embodiment of the disclosure.

FIG. 4 is a flow chart illustrating a method of handling correctable errors in a peripheral component interface express (PCI-e) bus according to one embodiment of the disclosure. Correctable errors may be serviced by an AER Handling Module (AHM) executing in a service partition, such as an advanced configuration and power interface (ACPI) service partition, of the hypervisor-based system. According to one embodiment, the ACPI service partition is a self-contained partition that services AERs. The hardware may be set to not generate a message signaled interrupt (MSI) on this category of errors.

A method begins at block 402 with the AHM periodically polling the root port's correctable error status register for errors. At block 404, it is determined if a bit in the register is set. If any of the bits in the correctable error registers are set, the AHM may collect and log information regarding the error at block 406 before returning to polling at block 402. In one embodiment, AER may not route any AER messages to the affected guest partitions but handle the AER message locally. In another embodiment, in addition to handling AERs locally, AERs may also be routed to affected guests partitions to take advantage of the AER handling mechanism in the operating system of each guest partition.

Figure 5:
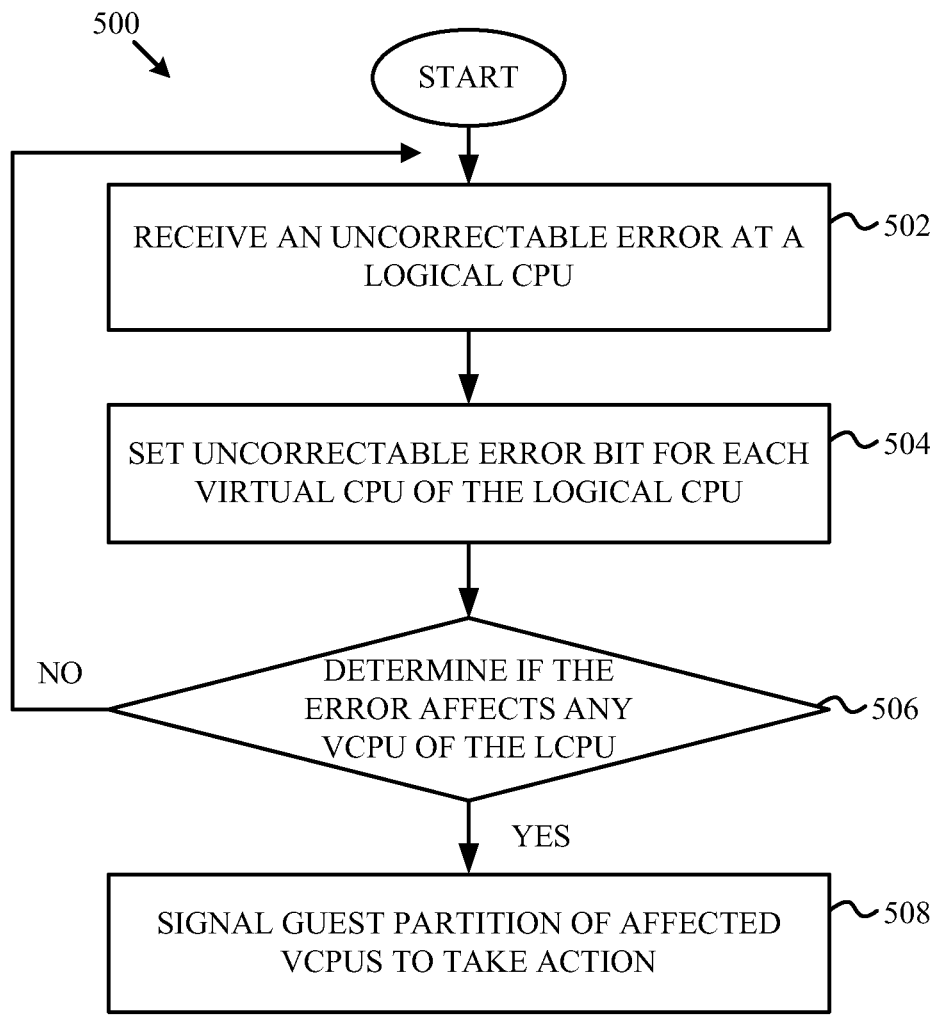
FIG. 5 is a flow chart illustrating a method of handling uncorrectable errors in a peripheral component interface express (PCI-e) bus according to one embodiment of the disclosure.

FIG. 5 is a flow chart illustrating a method of handling uncorrectable errors in a peripheral component interface express (PCI-e) bus according to one embodiment of the disclosure. A method 500 for handling an uncorrectable error begins at block 502 with receiving an uncorrectable error interrupt at a logical CPU (lCPU). At block 504, the uncorrectable error bit for each virtual CPU (vCPU) of the lCPU is set. At block 506, it is determined if the uncorrectable error affects any of the vCPUS of the lCPU. If none of the vCPUs are affected by the uncorrectable error, the method 500 returns to block 502 until another uncorrectable error for the lCPU is received. If the error does affect a vCPU, the method 500 continues to block 508 to signal the guest partition corresponding to the vCPU to take an action, such as shutting down. [The method of FIG. 5 is written from the "view" of the error handling module, rather than the guest partitions. Thus, although the guest partition may be monitoring for a service message we did not discuss it in this paragraph (although we did in other paragraphs). Please let us know if there is an inaccuracy or missing information.]

An uncorrectable error may be contained to affect only the guest partition or guest partitions that own the device or switch that generated the error interrupt. According to one embodiment, after an uncorrectable error occurs, guest partitions may be prevented from completing other outstanding commands with potentially undetected errors. For example, the guest partition may be prevented from receiving additional interrupts and/or other input/output (I/O) requests. Further, the affected guests may be prevented from servicing any interrupts until the error interrupt is handled. The other interrupts may be paused by setting an AER interrupt with a highest priority.

An AER message signaled interrupt (MSI) may be set to broadcast to all logical central processor units (lCPUs) in the hypervisor-based system, which prevents all the guest partitions from servicing any interrupts until the affected guest partitions are isolated. Monitors in each guest partition check for these broadcasts and may not be permitted to resume the guest partition until the check is complete. A bit, such as an AER Notification Flag (ANF), may be assigned to each of the vCPUs (virtual CPUs) of a lCPU (logical CPU). The ANF bit may be an indicator to a vCPUs monitor as to whether it should check for unrecoverable errors prior to resuming the guest partition. When an AER interrupt is received on an lCPU, the monitor servicing the interrupt on that lCPU may set all the ANF bits of all the vCPUs for that lCPU. Then, the monitor may check for uncorrectable errors. After checking for uncorrectable errors, the monitor clears the ANF bit for each vCPU and resumes the guest partition if no error bits are set by any devices owned by that guest partition. The same checks may be repeated each time a vCPU wakes up for a new quantum on their lCPU and the ANF bit for the vCPU is set.

When a monitor detects an uncorrectable error in any device owned by the guest partition, the guest partition may be paused and a state change message issued notifying the hypervisor-based system. After all vCPUs have woken up, all of the vCPUs' monitor instances will have serviced their ANF bits. The monitor instances of the affected vCPUs and the corresponding guest partition may then wait until an indication is received that provides instructions for the guest partitions.

According to one embodiment, the AER handling module (AHM) executing in the ACPI service partition may have access to error status registers of all the devices and switches in the hypervisor-based system. The AHM may signal to a monitor executing for a particular vCPU, corresponding to an affected guest partition, to force a system dump and reboot.

The AER Handling Module (AHM) in the ACPI service partition may be responsible for servicing both correctable and uncorrectable errors. In this embodiment, the AHM may periodically check a correctable error status register of all the root devices for correctable errors for one or more set bits, indicating a correctable error has occurred. Further, the AHM may respond to uncorrectable errors when an error interrupt occurs. Following the error interrupt, the AHM may read status registers under a root port and corresponding devices to discover a source of the error interrupt. Then, the AHM may log the error, send a message to the hypervisor-based system, force a system dump, and/or send a message to the guest partitions that are affected to shutdown.

Figure 6:
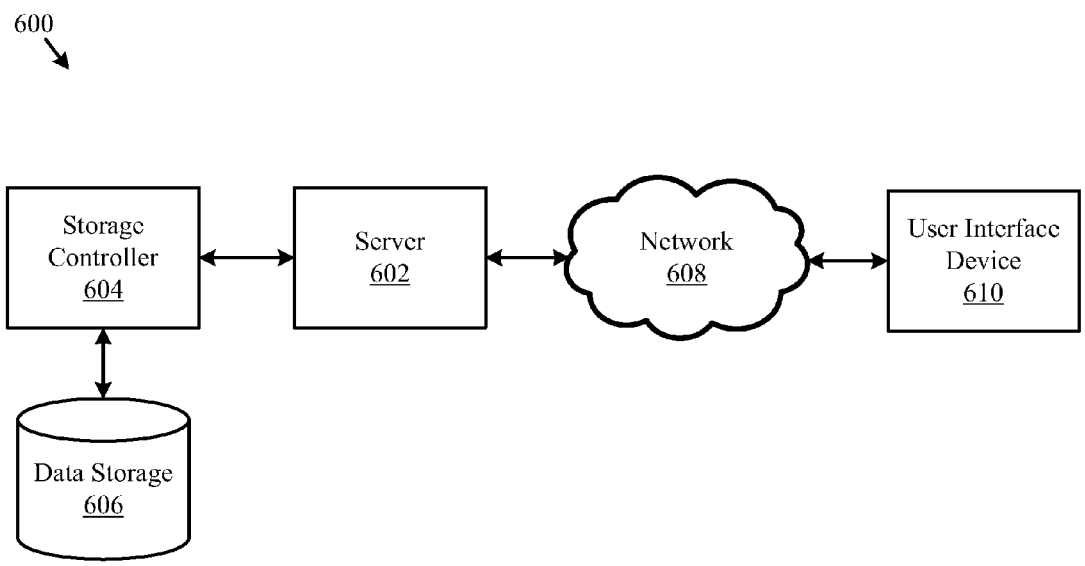
FIG. 6 is block diagram illustrating a computer network according to one embodiment of the disclosure.

FIG. 6 illustrates one embodiment of a system 600 for an information system, such as a system including a hypervisor-based system. The system 600 may include a server 602, a data storage device 606, a network 608, and a user interface device 610. The server 602 may be a dedicated server or one server in a cloud computing system. The server 602 may also be a hypervisor-based system executing one or more guest partitions. In a further embodiment, the system 600 may include a storage controller 604, or storage server configured to manage data communications between the data storage device 606 and the server 602 or other components in communication with the network 608. In an alternative embodiment, the storage controller 604 may be coupled to the network 608.

In one embodiment, the user interface device 610 is referred to broadly and is intended to encompass a suitable processor-based device such as a desktop computer, a laptop computer, a personal digital assistant (PDA) or tablet computer, a smartphone or other a mobile communication device having access to the network 608. When the device 610 is a mobile device, sensors (not shown), such as a camera or accelerometer, may be embedded in the device 610. When the device 610 is a desktop computer the sensors may be embedded in an attachment (not shown) to the device 610. In a further embodiment, the user interface device 610 may access the Internet or other wide area or local area network to access a web application or web service hosted by the server 602 and provide a user interface for enabling a user to enter or receive information.

The network 608 may facilitate communications of data, such as authentication information, between the server 602 and the user interface device 610. The network 608 may include any type of communications network including, but not limited to, a direct PC-to-PC connection, a local area network (LAN), a wide area network (WAN), a modem-to-modem connection, the Internet, a combination of the above, or any other communications network now known or later developed within the networking arts which permits two or more computers to communicate.

In one embodiment, the user interface device 610 accesses the server 602 through an intermediate sever (not shown). For example, in a cloud application the user interface device 610 may access an application server. The application server fulfills requests from the user interface device 610 by accessing a database management system (DBMS). In this embodiment, the user interface device 610 may be a computer or phone executing a Java application making requests to a JBOSS server executing on a Linux server, which fulfills the requests by accessing a relational database management system (RDMS) on a mainframe server.

Figure 7:
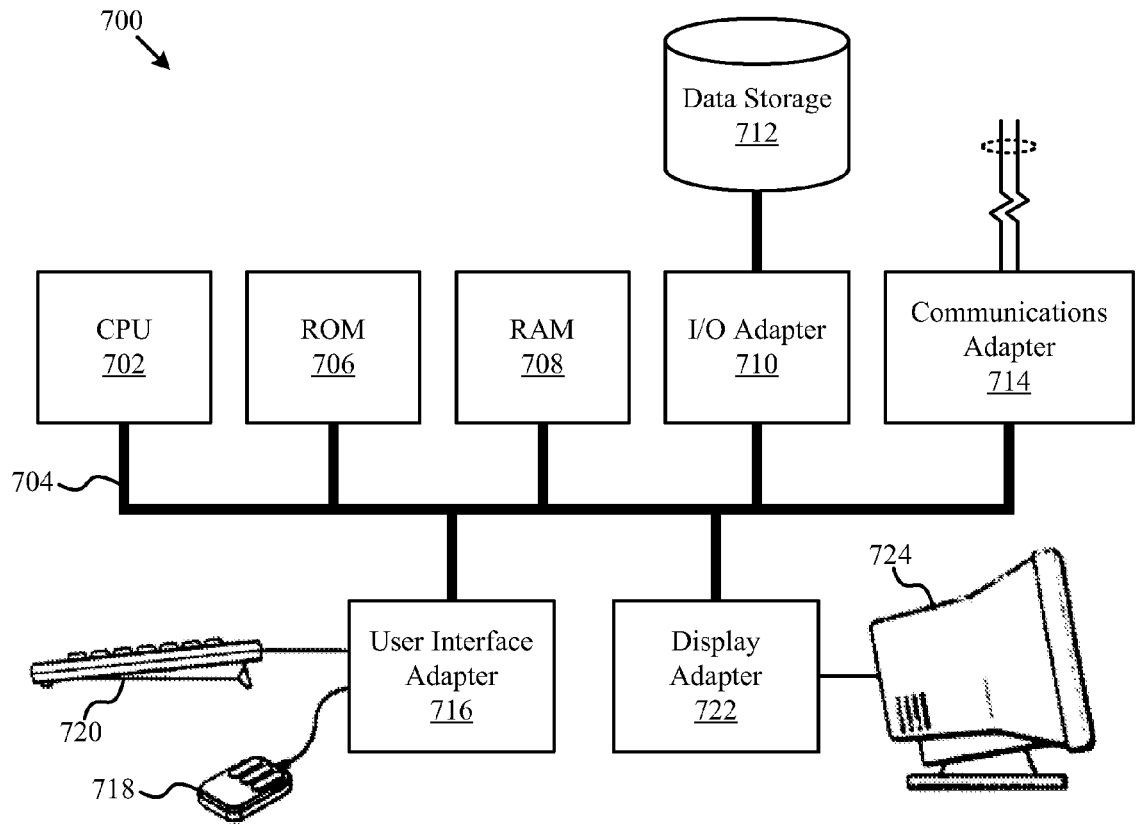
FIG. 7 is a block diagram illustrating a computer system according to one embodiment of the disclosure.

FIG. 7 illustrates a computer system 700 adapted according to certain embodiments of the server 602 and/or the user interface device 610. The central processing unit ("CPU") 702 is coupled to the system bus 704. The CPU 702 may be a general purpose CPU or microprocessor, graphics processing unit ("GPU"), and/or microcontroller. The present embodiments are not restricted by the architecture of the CPU 702 so long as the CPU 702, whether directly or indirectly, supports the operations as described herein. The CPU 702 may execute the various logical instructions according to the present embodiments.

The computer system 700 also may include random access memory (RAM) 708, which may be synchronous RAM (SRAM), dynamic RAM (DRAM), synchronous dynamic RAM (SDRAM), or the like. The computer system 700 may utilize RAM 708 to store the various data structures used by a software application. The computer system 700 may also include read only memory (ROM) 706 which may be PROM, EPROM, EEPROM, optical storage, or the like. The ROM may store configuration information for booting the computer system 700. The RAM 708 and the ROM 706 hold user and system data.

The computer system 700 may also include an input/output (I/O) adapter 710, a communications adapter 714, a user interface adapter 716, and a display adapter 722. The I/O adapter 710 and/or the user interface adapter 716 may, in certain embodiments, enable a user to interact with the computer system 700. In a further embodiment, the display adapter 722 may display a graphical user interface (GUI) associated with a software or web-based application on a display device 724, such as a monitor or touch screen.

The I/O adapter 710 may couple one or more storage devices 712, such as one or more of a hard drive, a solid state storage device, a flash drive, a compact disc (CD) drive, a floppy disk drive, and a tape drive, to the computer system 700. According to one embodiment, the data storage 712 may be a separate server coupled to the computer system 700 through a network connection to the I/O adapter 710. The communications adapter 714 may be adapted to couple the computer system 700 to the network 608, which may be one or more of a LAN, WAN, and/or the Internet. The communications adapter 714 may also be adapted to couple the computer system 700 to other networks such as a global positioning system (GPS) or a Bluetooth network. The user interface adapter 716 couples user input devices, such as a keyboard 720, a pointing device 718, and/or a touch screen (not shown) to the computer system 700. The keyboard 720 may be an on-screen keyboard displayed on a touch panel. Additional devices (not shown) such as a camera, microphone, video camera, accelerometer, compass, and or gyroscope may be coupled to the user interface adapter 716. The display adapter 722 may be driven by the CPU 702 to control the display on the display device 724. Any of the devices 702-722 may be physical, logical, or conceptual.

The applications of the present disclosure are not limited to the architecture of computer system 700. Rather the computer system 700 is provided as an example of one type of computing device that may be adapted to perform the functions of a server 602 and/or the user interface device 610. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, the computer system 700 may be virtualized for access by multiple users and/or applications.

Figure 8A:
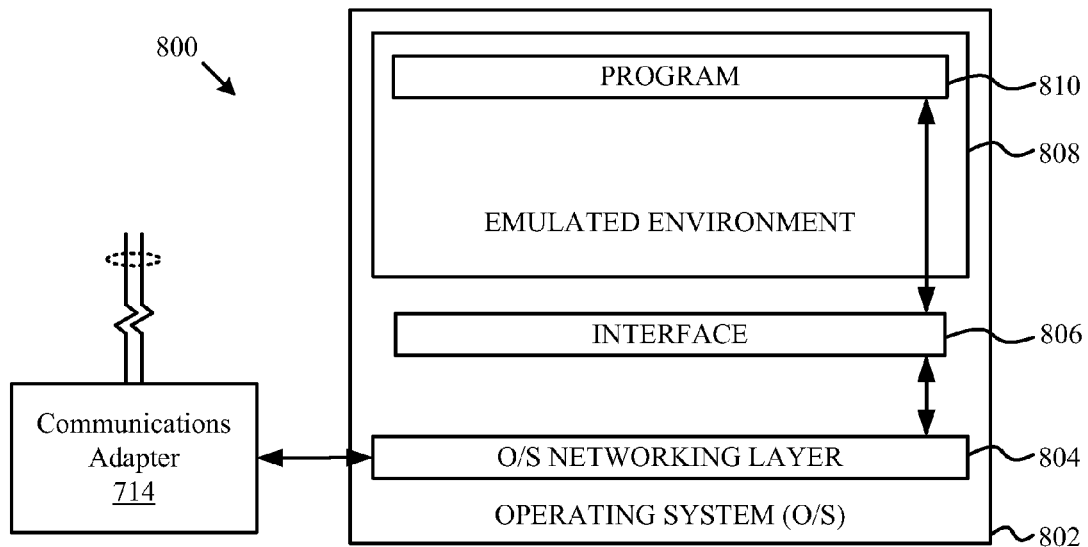
FIG. 8A is a block diagram illustrating a server hosting an emulated software environment for virtualization according to one embodiment of the disclosure.

FIG. 8A is a block diagram illustrating a server hosting an emulated software environment for virtualization according to one embodiment of the disclosure. An operating system 802 executing on a server includes drivers for accessing hardware components, such as a networking layer 804 for accessing the communications adapter 614. The operating system 802 may be, for example, Linux. An emulated environment 808 in the operating system 802 executes a program 810, such as CPCommOS. The program 810 accesses the networking layer 804 of the operating system 802 through a non-emulated interface 806, such as XNIOP. The non-emulated interface 806 translates requests from the program 810 executing in the emulated environment 808 for the networking layer 804 of the operating system 802.

Figure 8B:
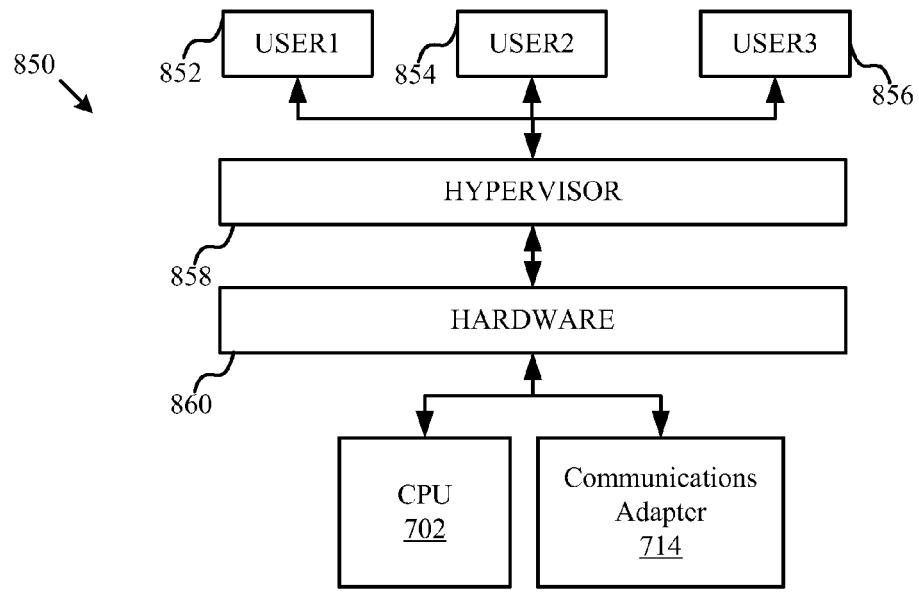
FIG. 8B is a block diagram illustrating a server hosing an emulated hardware environment according to one embodiment of the disclosure.

In another example, hardware in a computer system may be virtualized through a hypervisor. FIG. 8B is a block diagram illustrating a server hosing an emulated hardware environment according to one embodiment of the disclosure. Users 852, 854, 856 may access the hardware 860 through a hypervisor 858. The hypervisor 858 may be integrated with the hardware 860 to provide virtualization of the hardware 860 without an operating system, such as in the configuration illustrated in FIG. 8A. The hypervisor 858 may provide access to the hardware 860, including the CPU 702 and the communications adaptor 714.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method, comprising:
   receiving, from a bus of a hypervisor-based system, an error interrupt;
   identifying at least one affected guest partitions from a plurality of guest partitions executing on the hypervisor-based system; and
   broadcasting the error interrupt to the affected guest partitions;
   wherein when the error interrupt corresponds to a correctable error, a service partition processes the error interrupt locally, and
   when the error interrupt corresponds to an uncorrectable error at a logical CPU, the method further comprises:
      setting an uncorrectable error bit for each virtual CPU of the logical CPU;
      determining whether the error interrupt affects any of the virtual CPUs of the logical CPU; and
      signaling the guest partition corresponding to the one or more of the virtual CPUs of the existence of the error interrupt to enable the guest partition to take corrective action when the error interrupt affects one or more of the virtual CPUs of the logical CPU.

2. The method of claim 1, in which the step of identifying the affected guest partitions comprises determining owners of a device in the hypervisor system that generated the error interrupt.

3. The method of claim 1, in which the bus is a peripheral component interconnect express (PCI-e) bus; and the error interrupt comprises a corrupt data error interrupt.

4. The method of claim 1, wherein the service partition processing the error interrupt comprises: taking corrective action without notifying the guest partitions and logging the error.

5. The method of claim 1, further comprising preventing reception of further error interrupts from the bus after receiving the error interrupt.

6. The method of claim 1, further comprising performing a corrective action after broadcasting the error interrupt and
   the performing the corrective action comprises shutting down the affected guest partitions.

7. A computer program product, comprising:
   a non-transitory computer readable medium comprising:
      code to receive, from a bus of a hypervisor-based system, an error interrupt;
      code to identify at least one affected guest partitions from a plurality of guest partitions executing on the hypervisor-based system;
      code to broadcast the error interrupt to the affected guest partitions;
      code to process the error interrupt locally by a service partition when the error interrupt corresponds to a correctable error; and
      when the error interrupt corresponds to an uncorrectable error at a to CPU, the computer readable medium further comprises:
         code to set an uncorrectable error bit for each virtual CPU of the logical CPU;
         code to determine whether the error interrupt affects any of the virtual CPUs of the logical CPU; and
         code to signal the guest partition corresponding to the one or more of the virtual CPUs of the existence of the error interrupt to enable the guest partition to take corrective action when the error interrupt affects one or ore of the virtual CPUs of the logical CPU.

8. The computer program product of claim 7, in which the medium further comprises code to determine owners of a device in they hypervisor-based system that generated the error interrupt.

9. The computer program product of claim 7, in which the bus is a peripheral component interconnect express (PCI-e) bus; and
the medium further comprises code to prevent reception of further error interrupts from the bus after receiving the error interrupt.

10. The computer program product of claim 7, in which wherein the service partition processing the error interrupt comprises: taking corrective action without notifying the guest partitions and logging the error.

11. The computer program product of claim 10, in which the medium further comprises code to shut down the affected guest partitions.

12. An apparatus, comprising:
a bus; and
a processor coupled to the bus, in which the processor is configured:
to receive from the bus an error interrupt;
to identify at least one affected guest partitions from a plurality of guest partitions executing on the processor;
to broadcast the error interrupt to the affected guest partitions; and
to process the error interrupt locally by a service partition when the error interrupt corresponds to a correctable error;
wherein the service partition processing the error interrupt comprises: taking corrective action without notifying the guest partitions and logging the error; and
when the error interrupt corresponds to an uncorrectable error at a logical CPU, the method further comprises:
setting an uncorrectable error bit for each virtual CPU of the logical CPU;
determining whether the error interrupt affects any of the virtual CPUs of the logical CPU; and
when the error interrupt affects one or more of the virtual CPUs of the logical CPU, signaling the guest partition corresponding to the one or more of the virtual CPUs of the existence of the error interrupt to enable the guest partition to take corrective action.

13. The apparatus of claim 12, in which the bus is a peripheral component interconnect express (PCI-e) bus.

14. The apparatus of claim 13, further comprising a device coupled to the bus, in which the device generates the error interrupt.

15. The apparatus of claim 14, in which the device is a storage device and the error interrupt corresponds to a failed data storage command.

16. The apparatus of claim 14, further comprising a root port coupled between the bus and the device.

17. The apparatus of claim 16, in which the processor is further configured to identify affected guests by determining owners of the device generating the error interrupt.

18. The apparatus of claim 12, in which the processor is further configured to prevent reception of further error interrupts from the bus after receiving the error interrupt.

* * * * *